(12) United States Patent
Lee et al.

(10) Patent No.: US 6,343,796 B1
(45) Date of Patent: Feb. 5, 2002

(54) GASKET ARRANGEMENT

(75) Inventors: Brian Thomas Lee, Charlotte; Edward Allen Covington, Gastonia, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/474,062

(22) Filed: Dec. 29, 1999

(51) Int. Cl.$^7$ .................................................. F16L 5/00
(52) U.S. Cl. ........................................ 277/605; 277/645
(58) Field of Search ............................. 277/593, 605, 277/645, 646, 608

(56) References Cited

U.S. PATENT DOCUMENTS

| | | | |
|---|---|---|---|
| 2,825,941 A | * | 3/1958 | Lux et al. ............... 277/646 X |
| 4,410,186 A | | 10/1983 | Pierce, Jr. |
| 4,457,517 A | * | 7/1984 | Dunegan ................... 277/608 |
| 4,558,869 A | | 12/1985 | Grove et al. |
| 4,600,054 A | | 7/1986 | Miller et al. |
| 5,035,637 A | | 7/1991 | Mathews et al. |
| 5,066,023 A | | 11/1991 | Ma |
| 5,290,045 A | * | 3/1994 | Terauchi et al. ......... 277/646 X |
| 5,971,402 A | * | 10/1999 | Northrop et al. ....... 277/608 X |

* cited by examiner

Primary Examiner—Robert J. Sandy
Assistant Examiner—Karlena D. Schwing
(74) Attorney, Agent, or Firm—Millen, White, Zelano & Branigan, P.C.

(57) ABSTRACT

A gasket arrangement for sealing between first and second components includes a tube through the material of the gasket for transferring fluid through the gasket. The first and second components may be, for example, a transmission case and transmission fluid pan.

14 Claims, 3 Drawing Sheets

GASKET ARRANGEMENT

FIELD OF THE INVENTION

The present invention is directed to gasket arrangements, and more particularly, the present invention is directed to gasket arrangements for chambers which communicate with spaces outside of the chambers so that there is fluid transport between the interior of the chamber and locations outside of the chamber.

BACKGROUND OF THE INVENTION

Mechanical systems such as engines and transmissions are comprised of several sections and components which must be joined together with a fluid-type seal so that there are chambers defined by the sections and components. Frequently, tubes or pipes extend from these chambers to other components of the mechanical system. In the prior art, this has been accomplished by providing a hole in one or more of the components and seating a tube in the hole. Making a hole in a component which is fluid tight around a tube can be relatively expensive. If there happens to be a leak around the tube, then it is frequently less expensive to replace the entire component rather than fixing the leak. There is a continuing need to reduce manufacturing costs in order to remain competitive and in that there is a need for improving reliability as well as making repairs and correcting defects as inexpensively as possible.

Currently, many automotive engines and transmissions utilize engineered gaskets to seal interfaces between transmission pans and transmission cases, cam covers and cam heads, manifolds and intakes, engine blocks and oil pans as well as many other interfaces. These gaskets are generally made of a thermoplastic material and have rubber ribs molded into grooves on opposite sides of the gaskets.

With engines and transmissions, there is a need to extend tubes through the walls of engine blocks and cases. Transmissions are of a specific situation in which hot transmission fluid is cooled by routing fluid through a radiator. As is seen in FIG. 1, it is current practice to machine through a case in order to seat a tube therein so that transmission fluid within the case can be pumped through the tube into a heat exchanger associated with a radiator. The fluid is then returned to the interior of the transmission case by a second tube seated in a second hole which has been machined in the case. As has been previously set forth, machining holes through metal casings is a relatively expensive arrangement.

SUMMARY OF THE INVENTION

In view of the above-discussed considerations, there is a need for a new and improved arrangement in gasketed assemblies for providing fluid communication between the interior of a chamber defined by these components and the exterior of that chamber.

In view of this feature and other features, the present invention is directed to a gasket with a tube therethrough wherein the gasket is useful for sealing between first and second components defining a chamber. The gasket comprises a body which has faces for sealing with opposed surfaces of the first and second components. The tube extends through the body to establish communication between the interior of the chamber and locations outside of the chamber.

In a more specific aspect, the body is of a relatively stiff construction and has a pair of opposed ribs thereon which facilitate the seal.

In a still more specific aspect of the invention, the tube is round.

In still a more specific aspect of the invention, the tube is non-round, or flattened.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein.

DETAILED DESCRIPTION

Figure 1:
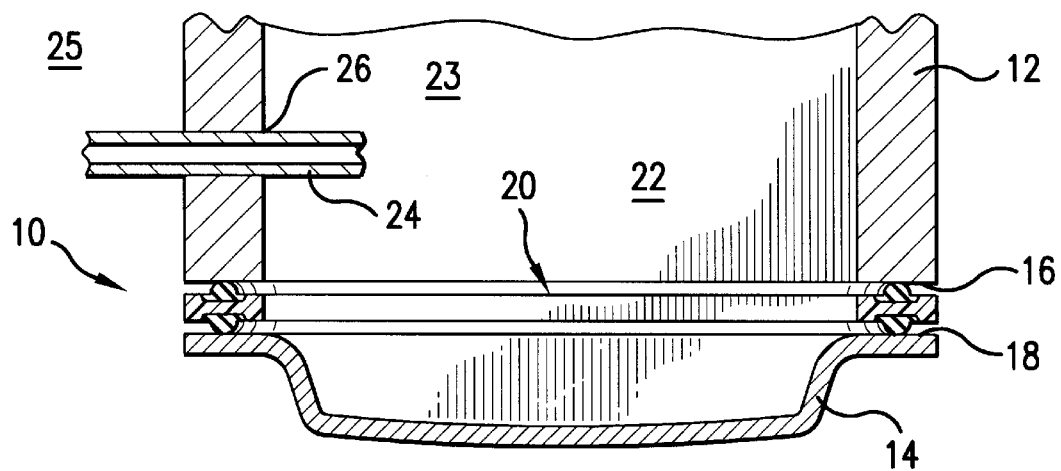
FIG. 1 is a side elevation of a prior art sealing arrangement showing a first and second components having a sealing gasket therebetween.
Figure 2:
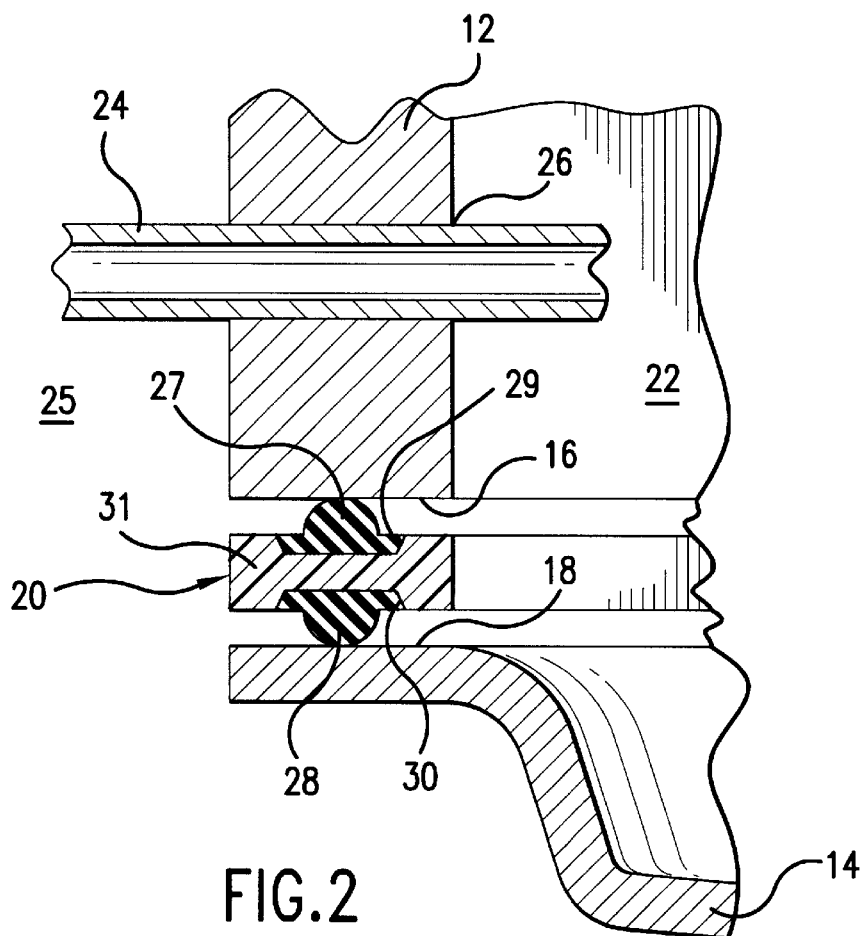
FIG. 2 is an enlarged view of the prior art arrangement shown in FIG. 1.

Referring now to FIGS. 1 and 2, there is shown a prior art arrangement 10 in which a first component 12 and a second component 14 having opposed substantially parallel surfaces 16 and 18 are assembled adjacent to one another with an engineered gasket 20 sealing between the first and second components to define a chamber 22. In order to provide communication between the interior space 23 defined by the chamber 22 and exterior location 25, a tube 24 extends through a hole 26 in the first component 12.

As is seen in FIG. 2, the engineered gasket 20 includes a first elastic rib 27 having a first face 27a which engages the surface 16 and a second elastic rib 28 which engages the surface 18. The first and second faces are diametrically opposed sealing faces. The elastic ribs 27 and 28 are seated in grooves 29 and 30 formed in an elongated thermoplastic body 31.

In the prior art embodiment of FIGS. 1 and 2, the first component 12 may be a transmission case while the second component 14 is a transmission pan. Alternatively, the first component 12 might be an internal combustion engine head and the second component 14 a cam cover, or the first component may be of an internal combustion engine air intake and the second component 14 a manifold. In still another example, the first component 12 is an engine block and the second component 14 a lubricating oil pan. In each of these cases, the tube 24 is received through a bore 26 in a relatively expensive component. In a number of the cases, it is necessary to have both an exit tube 24 and a return tube 24 which requires a pair of machine bores 26.

Figure 3:
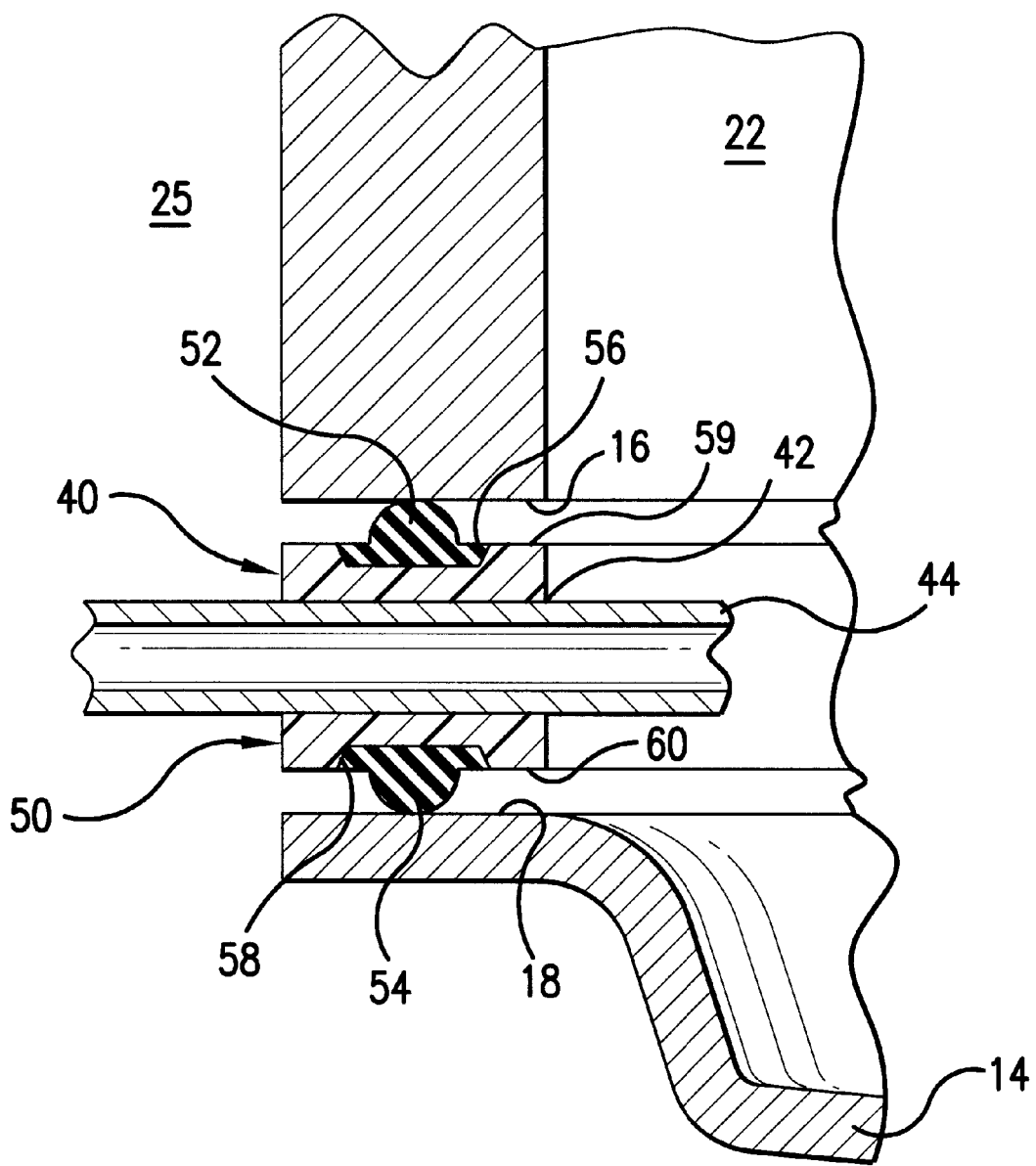
FIG. 3 is a side elevation of an arrangement in accordance with the present invention showing a tube extending through a gasket.

Referring now to FIG. 3, there is shown an arrangement in accordance with the present invention in which an engineered gasket 40 disposed between the first component 12 and the second component 14 has a passage 42 therethrough which receives a tube 44. The tube 44 extends between the chamber 22 and an outside location 25. By placing the tube 44 through the gasket 40, there is no need to machine a bore 26 through the wall of either the first component 12 or the second component 14, as is the case with the prior art shown in FIGS. 1 and 2.

Preferably, the tube 44 is molded into the thermoplastic material of which the relatively stiff non-deformable body 50 of the gasket 40 is made. Like the arrangement of FIGS. 1 and 2, the body 50 has first and second elastic ribs 52 and 54, respectively, which have first and second diametrically opposed sealing faces 55a and 55b seal with the substantially parallel opposing surfaces 16 and 18 on the first component 12 and the second component 14, respectively. The elastic ribs 52 and 54 are seated in grooves 56 and 58 formed in first and second faces 59 and 60 of the body 50.

Figure 4:
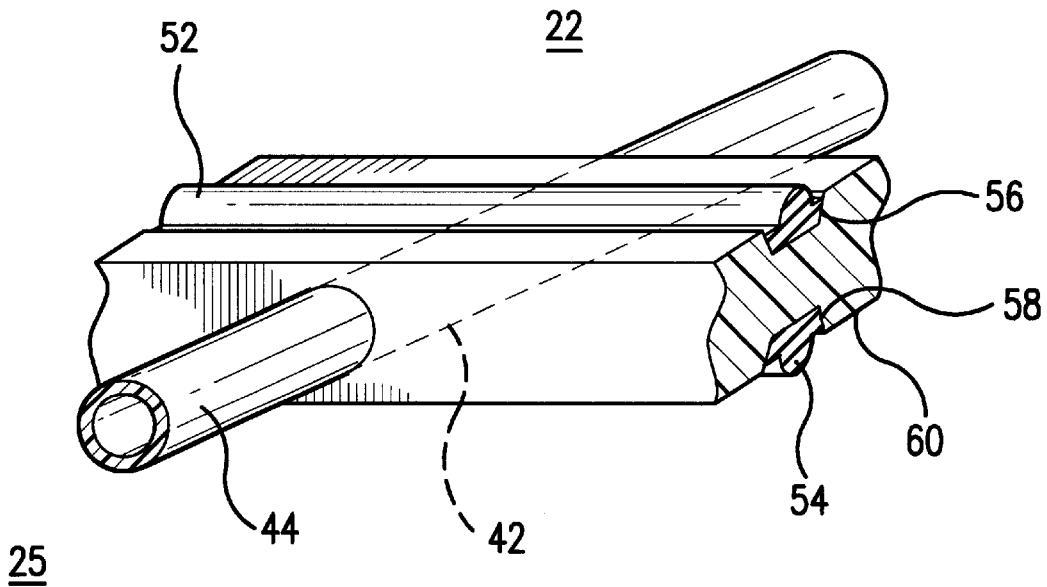
FIG. 4 is a perspective view of a portion of a gasket configured in accordance with the principles of FIG. 3 showing a round tube extending through the gasket.
Figure 5:
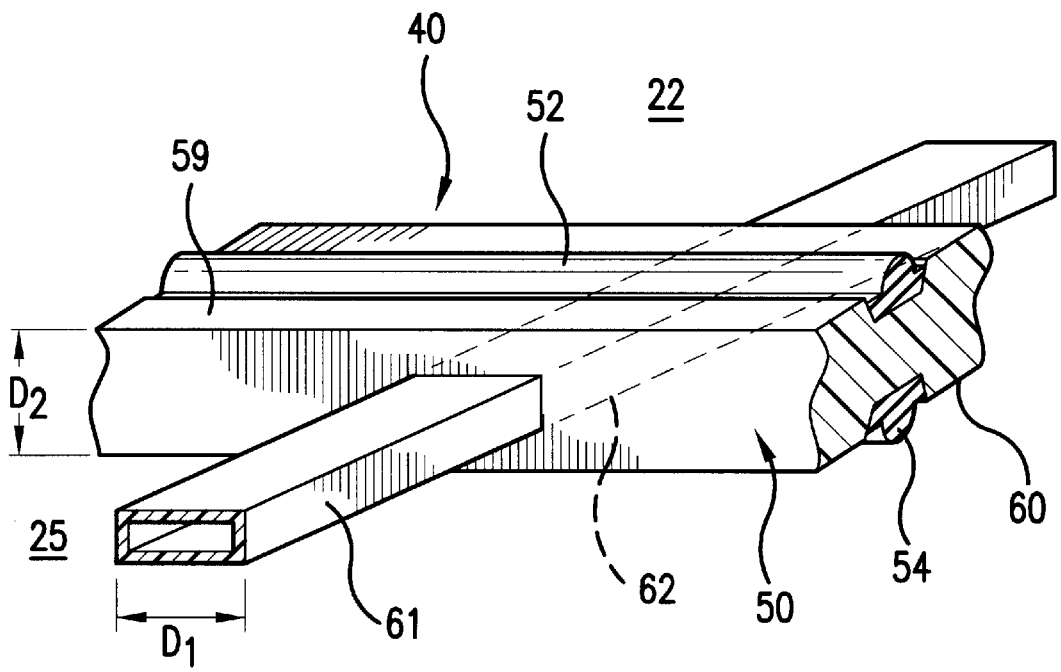
FIG. 5 is a perspective view of a gasket such as the gasket shown in FIG. 3 wherein a tube which is non-round or oblong passes through the gasket.

In the embodiment of FIGS. 3 and 4, the tube 44 is round; however, in the embodiment of FIG. 5, the tube has been flattened to form a non-round tube 61 seated in a non-round hole 62. The non-round tube 61 has a generally rectangular or oblong cross-section and is a preferred embodiment. The tube 61 has a first dimension $D_1$ extending in the direction of the first and second faces 59 and 60 of the elongated body 50, which first dimension $D_1$ is greater than a second dimension $D_2$ that extends perpendicular to the direction of the first and second faces of the body. With the arrangement of FIG. 5, the body 50' can be thinner, if necessary or desired.

The gasket 40 may have a plurality of tubes 44 extending therethrough. For example, if the gasket 40 is used to seal between a transmission case 12 and a transmission pan 14, a first tube 44 can be used to transmit transmission oil from the chamber 22 to a heat exchanger (not shown) in a radiator (not shown) of a vehicle to be cooled, while a second tube 44 returns the transmission fluid to the chamber.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A gasket useful for sealing between opposed surfaces of first and second components wherein fluid is disposed in a chamber defined by the first and second components, the gasket comprising:

a body having a first face for sealing with the first component and a second face for sealing with the second component upon the opposed faces of the components being moved toward one another to compress the gasket therebetween, and a tube extending through the body between the first and second faces, the tube having a first end adapted to be in communication with the chamber and a second end adapted to be in communication with a location outside of the chamber, whereby fluid within the chamber can flow through the gasket while the body seals with the first and second components.

2. The gasket of claim 1, wherein the tube has a round cross section.

3. The gasket of claim 1, wherein the tube has an oblong cross section with a first dimension extending in the direction of the first and second faces, which first dimension is less than a second dimension extending transverse to the direction of the first and second faces.

4. The gasket of claim 1, wherein the body includes first and second ribs extending therewith the first and second ribs having thereon the first and second faces, respectively, of the body for engaging the opposing faces of the first and second components to seal with the first and second faces.

5. The gasket of claim 4, wherein the ribs are deformable under compression and the body is relatively non-deformable under compression.

6. The gasket of claim 5, wherein the body has oppositely opening grooves therein in which the ribs are seated.

7. The gasket of claim 6, wherein the ribs are made of a rubber material and the body of a thermoplastic material.

8. The gasket of claim 5, wherein the ribs are made of a rubber material and the body of a thermoplastic material.

9. The gasket of claim 1 wherein the first and second faces are diametrically opposed.

10. In combination with a first and a second component having opposed surfaces and defining a chamber having fluid wherein, a gasket comprising:

a body having a first face for sealing with the first component and a second face for sealing with the second component upon the opposed faces of the components being moved toward one another to compress the gasket therebetween, and a tube extending through the body between the first and second faces, the tube having a first end adapted to be on communication with the chamber and a second end adapted to be in communication with a location outside of the chamber, whereby fluid within the chamber can flow through the gasket while the body seals with the first and second components.

11. The combination of claim 10 wherein the first and second faces for sealing are diametrically opposed.

12. The gasket of claim 10, wherein the first component comprises a transmission case and the second component comprises a sump pan, and wherein the opposed surfaces are parallel.

13. The gasket of claim 10, wherein the first component comprises an internal combustion engine head and the second component comprises a cam cover, and wherein the opposed surfaces are parallel.

14. The gasket of claim 10, wherein the first component comprises an engine intake and the second component comprises a manifold, and wherein the opposed surfaces are parallel.

* * * * *

UNITED STATES PATENT AND TRADEMARK OFFICE
CERTIFICATE OF CORRECTION

PATENT NO. : 6,343,796 B1 Page 1 of 1
DATED : February 5, 2002
INVENTOR(S) : Lee et al.

It is certified that error appears in the above-identified patent and that said Letters Patent is hereby corrected as shown below:

Column 4,
Line 24, after "first" insert -- component --.
Line 24, delete "wherein" and insert -- therein --.
Line 34, delete "on" and insert -- in --.

Signed and Sealed this

Fifth Day of August, 2003

JAMES E. ROGAN
*Director of the United States Patent and Trademark Office*